US007506619B1

(12) United States Patent
Lak et al.

(10) Patent No.: US 7,506,619 B1
(45) Date of Patent: Mar. 24, 2009

(54) TUNABLE HYBRID BRACKET ASSEMBLY

(75) Inventors: Joseph M. Lak, Plymouth, MI (US); Robert C. Michniewicz, Jr., Livonia, MI (US); Mickey L. Love, Londonderry, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 34 days.

(21) Appl. No.: 11/871,538

(22) Filed: Oct. 12, 2007

(51) Int. Cl.
*F02B 67/00* (2006.01)
*F16M 13/00* (2006.01)

(52) U.S. Cl. ............................... 123/41.49; 123/195 A; 248/562

(58) Field of Classification Search .............. 123/41.49, 123/195 A; 248/562, 629, 638
See application file for complete search history.

(56) References Cited

U.S. PATENT DOCUMENTS

| | | | |
|---|---|---|---|
| 6,471,179 B1 | 10/2002 | Tousi et al. | |
| 6,484,976 B1 | 11/2002 | Boutin | |
| 6,574,997 B1 | 6/2003 | Mayer et al. | |
| 6,766,779 B2 * | 7/2004 | Lee ........................ | 123/184.21 |
| 2006/0026771 A1 | 2/2006 | Houser et al. | |
| 2006/0059960 A1 | 3/2006 | Hansen | |

* cited by examiner

*Primary Examiner*—Noah Kamen
(74) *Attorney, Agent, or Firm*—Ronald W. Wangerow; Harness, Dickey & Pierce, P.L.C.

(57) ABSTRACT

A motor vehicle engine and cooling fan arrangement mounted together by means of a tunable bracket assembly. The bracket assembly includes a bracket member, a washer and a bushing. The bracket member has an angled configuration for attenuating vehicular noise, vibration and harshness and the washer integrally formed therewith. The bushing is received in the bracket member for attenuated attachment to the vehicle engine.

17 Claims, 3 Drawing Sheets

TUNABLE HYBRID BRACKET ASSEMBLY

FIELD

The present disclosure relates to a bracket assembly suitable for mounting structures to one another and for absorbing vibration and movement therebetween. More specifically, the present disclosure relates to a tunable hybrid bracket assembly for mounting a fan to a vehicle engine.

BACKGROUND

The statements in this section merely provide background information related to the present disclosure and may not constitute prior art.

In operation, an engine transforms heat energy into mechanical energy. However, the heat energy is not completely consumed. Unused heat is retained by the engine and over time can cause engine temperature to increase to an undesirable level. A cooling system is used to remove the excess heat from the engine and maintain an ideal operating temperature. When at ideal temperature, the engine performs more efficiently, emissions are lower and component wear is minimized.

The cooling system employs various methods for achieving and maintaining the ideal temperature. Typically, a liquid coolant flows through pipes and passageways in the engine. As the coolant flows through the pipes and passageways, it absorbs the excess heat and transfers it to a radiator. The radiator has fins which conduct heat from the coolant flowing within the radiator to the surrounding air. When airflow is satisfactory, the heated air will be removed from the system. However, in unsatisfactory conditions, such as, stationary or slow-moving airflow conditions (i.e. when the vehicle is stopped or in heavy traffic), a fan may be operated to generate an additional airflow. The fan may be turned on and off at specific temperatures to maintain a desired system temperature for increased engine efficiency and can also be active during air conditioner and defroster activity.

In compact engine compartments such as, vehicle engine compartments, the fan may be mounted directly to the vehicle engine. Engine vibration can damage electrical components in the fan housing.

SUMMARY

Accordingly, the design of the present disclosure includes a motor vehicle engine having a cooling fan for removing excess heat from the vehicle engine mounted together by means of a tunable bracket assembly. The bracket assembly includes a bracket member, a washer and a bushing. The bracket member has an angled configuration for attenuating vehicular noise, vibration and harshness and the washer integrally formed therewith. The bushing is press fit in the bracket member for attenuated attachment to the vehicle engine.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
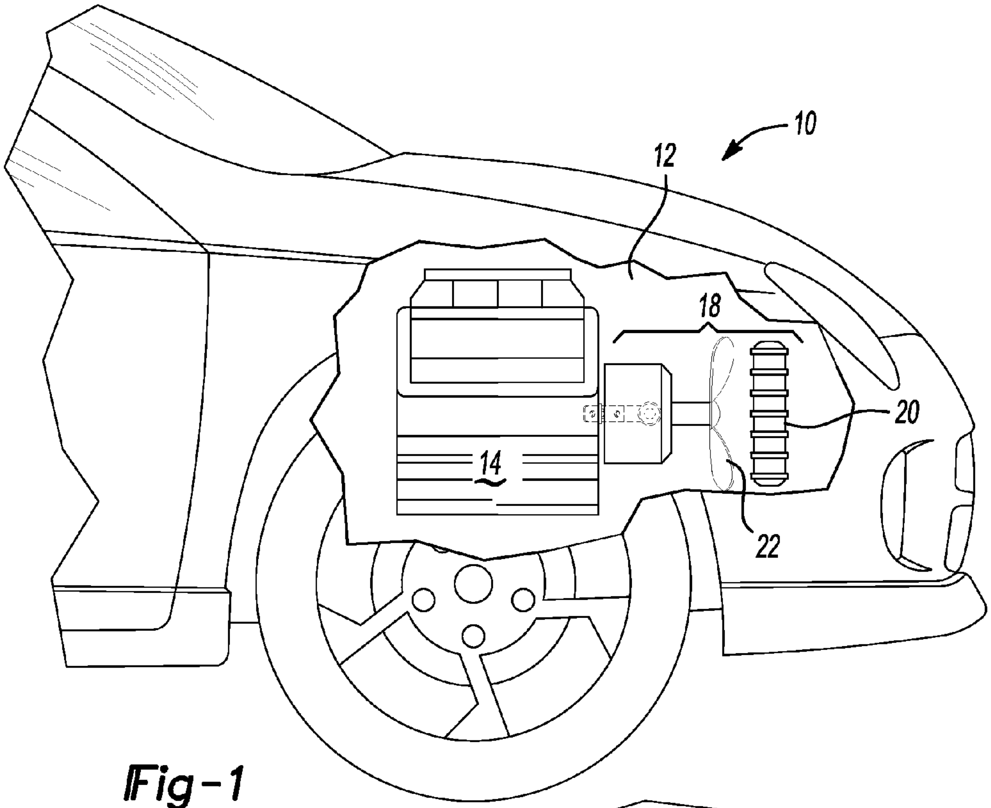
FIG. 1 is a schematic view of an exemplary vehicle engine compartment in accordance with the principles of the present teachings.

FIG. 1 depicts a typical automotive vehicle 10. The vehicle 10 includes an underhood or engine compartment 12 for packaging vehicular componentry. While FIG. 1 depicts an automotive vehicle, the present teachings may also be applied to other configurations such as, test stands, boats, aircraft and other industrial applications where a mounting bracket assembly can be utilized to isolate and/or absorb vibrations between two structures.

The engine compartment 12 typically includes an array of parts such as an engine 14, an air induction system (not shown) and a cooling system 18 to name but a few. The cooling system 18 of the vehicle 10 may be used to remove heat from the engine 14 by means of various devices including coolant, a radiator, a cooling fan, etc. The coolant moves through pipes and passageways (not shown) in the engine 14, the radiator 20 uses fins to disperse heat, and a cooling fan 22 removes stagnant heat from the system. Each of these devices may be used singly or may be combined to obtain optimal system performance.

Figure 2:
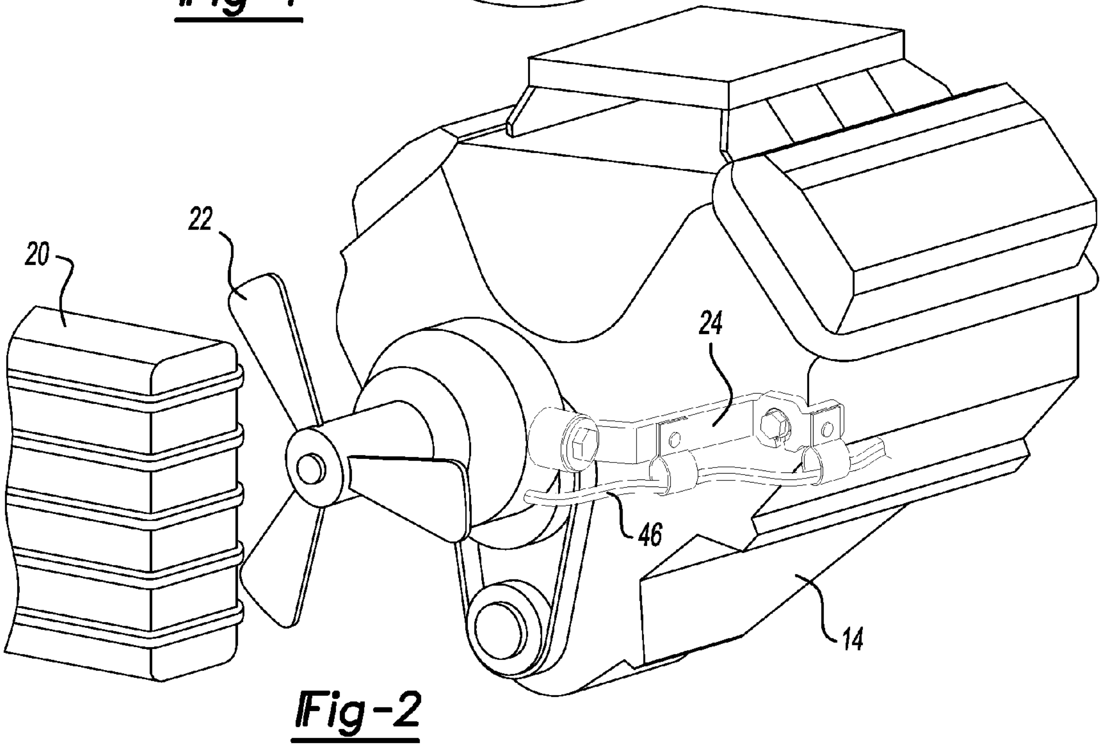
FIG. 2 is a perspective view of a cooling fan mounted to an engine by means of a tunable hybrid bracket assembly in accordance with the principles of the present teachings.
Figure 3:
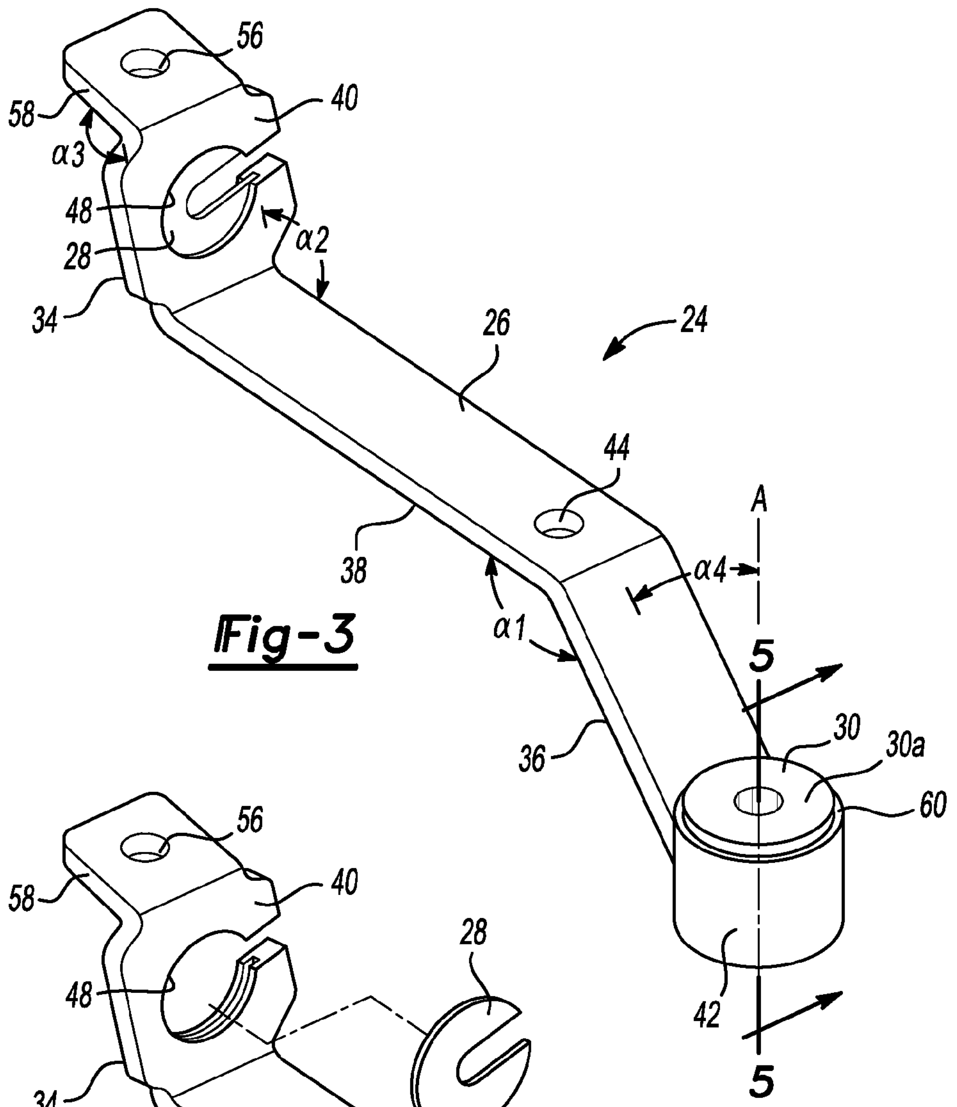
FIG. 3 is a perspective view of the tunable hybrid bracket assembly in accordance with the principles of the present teachings.

Referring now to FIG. 2, a tunable hybrid bracket assembly 24, which resists torque and isolates vibration, may be utilized to mount the cooling fan 22 to the engine 14. The tunable hybrid bracket assembly 24 includes a bracket member 26, a key-slotted washer 28 and a bushing 30, as shown in FIG. 3. The bracket member 26 is generally molded from a thermoplastic or thermoset material such as phenolic, polyester or vinylester. Alternatively, the bracket member 26 may be made of a metal such as steel, aluminum or magnesium, or a combination of metal and plastic material. The bracket member material may be chosen for characteristics including damping, stiffness and geometry, and is tunable from the resonant frequencies of engines or other sources.

Figure 4:
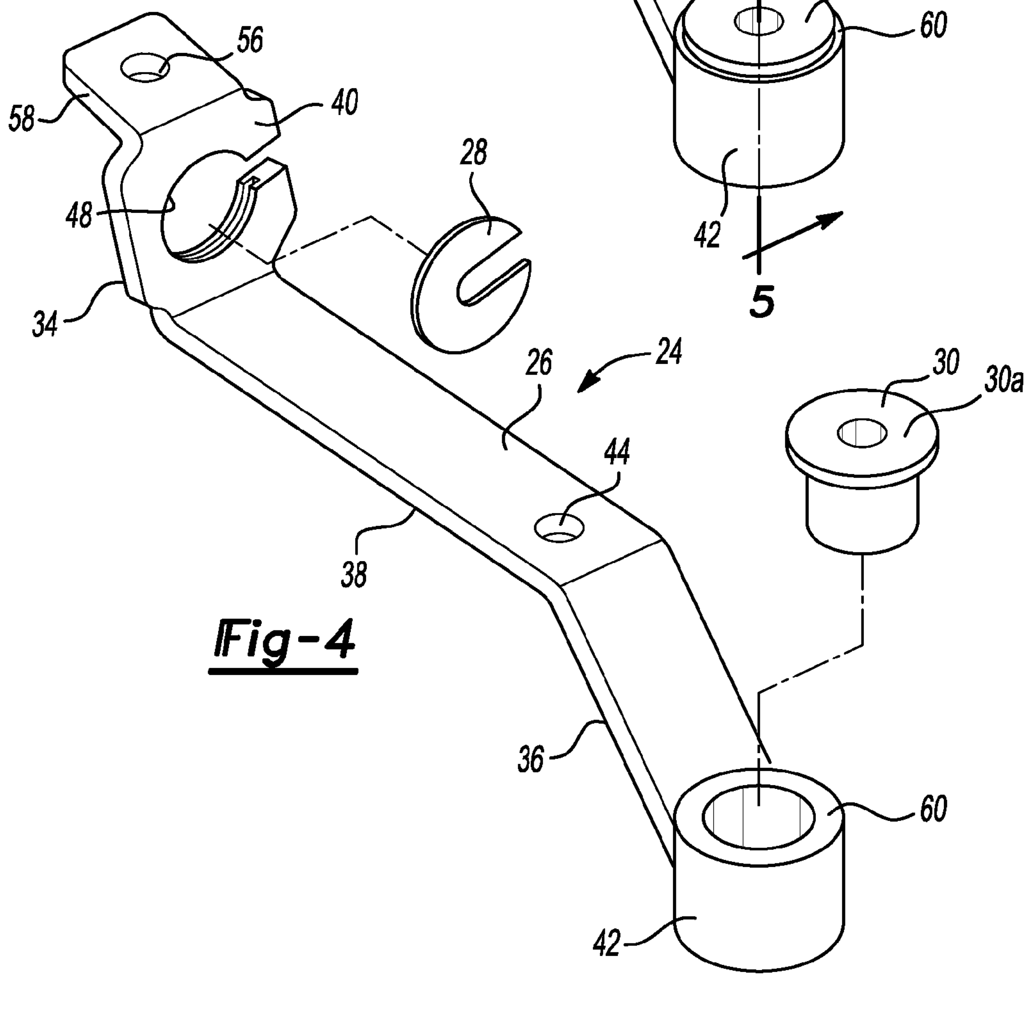
FIG. 4 is an exploded view of the tunable hybrid bracket assembly of FIG. 3 in accordance with the principles of the present teachings.

With reference to FIGS. 3 and 4, the bracket member 26 is discussed in further detail. The bracket member 26 may be an elongated body having a first end 34 for attachment to the engine 14, a second end 36 for attachment to the cooling fan 22 and an intermediate portion 38 therebetween. The first end 34 may be bent at an angle, $\alpha_2$, from the intermediate portion 38. The angle, $\alpha_2$, may be between 90 degrees and 180 degrees, and as shown approximately 120 degrees. The second end 36 may be bent at an angle, $\alpha_1$, from the intermediate portion 38. The angle, $\alpha_1$, may be between 90 degrees and 180 degrees, and as shown approximately 140 degrees. The first end 34 of the bracket member 26 may include a flange portion 40 and the second end 36 of the bracket member 26 may include a tubular portion 42. The tubular portion 42 may have an axis, A, through the bushing 30. The axis, A, and the second end 36 may have an inclusive angle, $\alpha_4$, between 0 degrees and 90 degrees and, as shown approximately 30 degrees. The intermediate portion 38 of the bracket member 26 may include a first thru hole 44 for receivably attaching a wiring harness 46 (as shown in FIG. 2). After attachment, the wiring harness 46 may behave as a mass to provide an additional element of mass damping for the system.

Figure 4A:
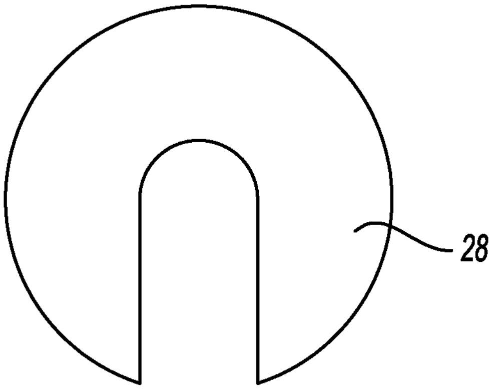
FIG. 4A is a top plan view of a key-slotted washer of the tunable hybrid bracket assembly in accordance with the principles of the present teachings.
Figure 4B:
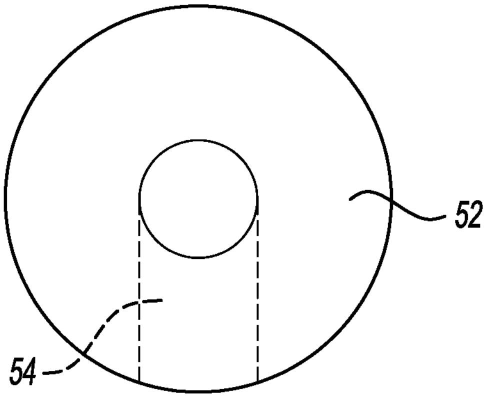
FIG. 4B is a top plan view of a circular washer of the tunable hybrid bracket assembly in accordance with the principles of the present teachings.

The flange portion 40 of the first end 34 may contain a key-slotted hole 48 for receiving the key-slotted washer 28 as shown in FIG. 4A. The key-slotted washer 28 may be insert molded in the bracket member 26 or may be incorporated post-molding. Alternatively as depicted in FIG. 4B, a circular washer 52 may be molded within the bracket member 26 during forming or incorporated post-molding. The bracket member 26 and circular washer 52 may then be machined to remove a portion of material which forms a key slot 54 for receivably attaching the engine 14 (depicted by dotted lines in the figure). The washer 28, 52 may be made of a metal such as steel, aluminum or magnesium; a plastic such as an elastomer, thermoplastic or thermoset; or a combination of metal and plastic material. The washer material may be chosen for characteristics including damping, stiffness and geometry, and is tunable for the resonant frequencies of engines or other sources.

Referring again to FIGS. 3 and 4, the bracket member 26 may form a second flange portion 56, adjacent to the first end 34 at an inclusive angle, $\alpha_3$. Angle, $\alpha_3$, may be between 90 degrees and 180 degrees, and as shown approximately 115 degrees. This second flange portion 56 may contain a second thru hole 58 for receivably attaching the wiring harness 46 as shown in FIG. 2. As previously noted, the wiring harness 46 may behave as a mass to provide an additional element of mass damping for the system.

The tubular portion 42 may receive the bushing 30. The bushing 30 is inserted into the tubular portion 42 until the bottom portion 30*a* extends axially above the top surface 60 of the tubular portion 42. In order to provide for ease in assembly, a highly compliant material, such as a foamed elastomeric material or natural rubber may be used for the bushing 30. Enhanced acoustical properties, such as those found in microcellular polyurethane (MCU) may also be desired. While the exemplary embodiment may utilize an MCU material because of its special tuning range for low dynamic stiffness, the foamed elastomeric material may also be a fluorocarbon, highly saturated nitrile (HNBR), methyl acrylate acid polymer, silicone, EPDM, Neoprene®, thermoset elastomer, thermoplastic elastomer, Santoprene®, Geolast®, Sarlink®, Hytrel®, or any other elastomeric foamed material suitable for the application.

Figure 5:
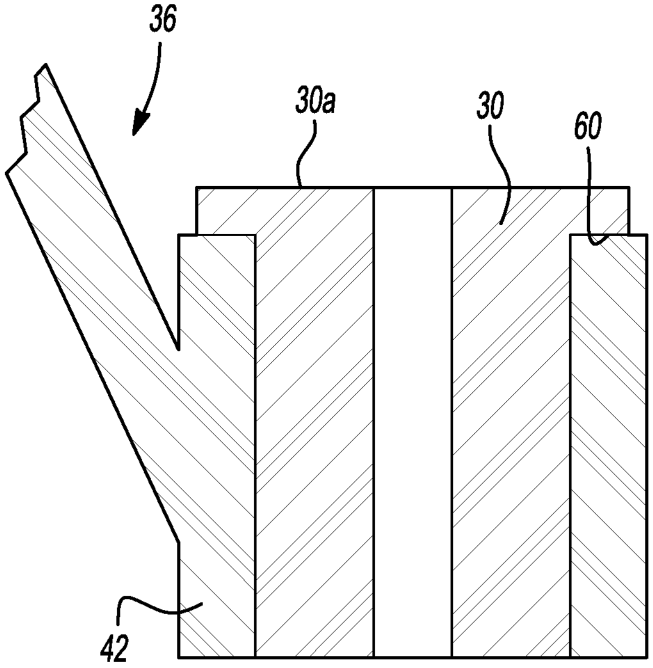
FIG. 5 is a cross-sectional view of the tunable hybrid bracket assembly taken along line 5-5 of FIG. 3.

Referring now to FIG. 5, a cross-sectional view of the bushing 30 after insertion is depicted. The bushing 30 is depicted as having a stepped cylindrical cross-section, however, the bushing 30 may also have any other suitable shape, including, for example, a full cylindrical shape.

The description of the invention is merely exemplary in nature and, thus, variations that do no depart from the gist of the invention are intended to be within the scope of the invention. Such variations are not to be regarded as a departure from the spirit and scope of the invention.

What is claimed is:

1. An engine system, comprising:

an engine defining a plurality of cylinders and including cooling passages therein;

coolant disposed in said cooling passages and in fluid communication with a radiator;

a cooling fan for removing excess heat from the radiator;

a bracket assembly for mounting said cooling fan to the engine, wherein said bracket assembly includes a bracket member having a first end and a second end, comprising an angled configuration for attenuating vehicular noise, vibration and harshness;

a washer, received in said bracket member at said first end; and a bushing, received in said bracket member at said second end.

2. The vehicle engine of claim 1, wherein said bracket member is formed from a plastic material.

3. The vehicle engine of claim 2, wherein said plastic material may be one of a thermoplastic or a thermoset material.

4. The vehicle engine of claim 1, wherein said washer is formed from a metal material.

5. The vehicle engine of claim 1, wherein said bushing is formed from a foamed elastomeric material.

6. The vehicle engine of claim 5, wherein said foamed elastomeric material is microcellular polyurethane (MCU).

7. The vehicle engine of claim 1, wherein said bracket member further comprises at least one thru hole to which a wiring harness is connected.

8. The vehicle engine of claim 1, wherein said angled configuration of said bracket member includes a first bend at said first end and a second bend at said second end.

9. The vehicle engine of claim 8, wherein said angled configuration of said bracket member further includes a third bend.

10. The vehicle engine of claim 8, wherein said first bend is from about 90 degrees to 180 degrees from said bracket member.

11. The vehicle engine of claim 8, wherein said second bend is from about 90 degrees to 180 degrees from said bracket member.

12. A mounting bracket assembly, comprising:

an elongated bracket member having a first end, a second end and an intermediate portion, said intermediate portion having a bent configuration, said second end being connected to a tubular portion;

a washer, inserted in said bracket member at said first end;

a bushing, inserted in said tubular portion of said bracket member.

13. The mounting bracket assembly of claim 12, further comprising a mounting hole extending through said intermediate portion of said bracket member.

14. The mounting bracket assembly of claim 12, wherein said bent configuration of said intermediate portion includes at least one bend at said second end and at least one bend at said first end of said intermediate portion.

15. The mounting bracket assembly of claim 12, wherein said tubular portion of said bracket member has an axis angled relative to said second end portion between 0 and 90 degrees.

16. The mounting bracket assembly of claim 12, wherein said first end is angled relative to said intermediate portion by an angle between 90 and 180 degrees.

17. The mounting bracket assembly of claim 12, wherein said second end is angled relative to said intermediate portion by an angle between 90 and 180 degrees.

* * * * *